June 19, 1973     T. H. DRWAL ET AL     3,740,231

COFFEE BREWER

Filed May 24, 1971

INVENTOR.
TED H. DRWAL
BY & MICHAEL J. PERLMAN

ATTORNEYS

United States Patent Office 3,740,231
Patented June 19, 1973

3,740,231
COFFEE BREWER
Ted H. Drwal, Chicago, Ill., and Michael J. Perlman, 533
 Brier Hill Road, Deerfield, Ill. 60015; said Ted A.
 Drwal assignor to said Michael J. Perlman
Filed May 24, 1971, Ser. No. 94,322
Int. Cl. A23f 1/08
U.S. Cl. 99—71
9 Claims

ABSTRACT OF THE DISCLOSURE

A no-drip siphonless beverage maker, for making coffee and the like, includes a tank of heated water which can be selectively discharged from the tank through the material from which the beverage is made. In addition to a thermostatically controlled heater located in heat transfer relation with water in the tank for heating the water in the normal manner, means are provided to maintain the top of the tank continuously heated to prevent the accumulated air from contracting during the brew cycle. This may be effected by use of a separate band heater at the top of the tank, by selective positioning of the thermostatically controlled heater or by use of heat insulation means at the top of the tank. During the brew cycle, hot water is discharged from the tank in the normal fashion, but in addition, sufficient air is released at the top of the tank during the cycle to insure that the air barrier between the top of the tank and the water is maintained at this portion of the tank. This keeps the level of the water in the tank at the level of the opening of the hot water discharge tube, thereby preventing dripping at the end of the brew cycle.

BACKGROUND OF THE INVENTION

This invention relates to a beverage maker and, more particularly, to a coffee maker in which the heating of the water within the tank by a standard thermostatically controlled heater is supplemented by maintaining an area of continuous heat at the upper portion of the tank to establish an air barrier which maintains the level of the water at the entrance to the hot water discharge tube, thereby eliminating drip at the end of the brew cycle.

In the past, coffee makers have been provided comprising a tank of heated water which is thermostatically maintained at an elevated temperature so as to be ready for brewing at all times. When it is desired to brew coffee in such coffee makers, a given amount of water is introduced into the tank displacing an identical amount of heated water through a discharge tube which communicates with the top of the tank, the tube discharging the heated water through the coffee grounds in a suitable receptacle to brew the coffee. Many of the prior types of coffee makers were subject to undesirable dripping of water from the discharge tube between brewing operations. Such drip is a result of the periodic expansion of the water in the water filled tank caused by the periodic thermostatically controlled heating of the water provided to maintain the water at a temperature in readiness for brewing. Such drip has been avoided in the prior coffee makers generally by providing relatively elaborate or expensive siphoning arrangements.

In order to obviate the disadvantages of the above-noted prior coffee makers, the beverage maker constructed in accordance with the principles of our invention comprises a hot water tank having an inlet water supply line with a normally closed valve therein, a hot water discharge line for delivering hot water from the tank to the coffee grounds during the brew cycle, an air accumulator space vent tube extending from the top of the tank and communicating with the hot water discharge line, said vent tube having a normally open valve therein, an immersion heater and thermostat in heat transfer relation with the water within the tank, and means to maintain the temperature at the upper portion of said tank so as to maintain an air barrier of desired volume at the top of the tank thereby keeping the water at the level of the inlet opening of hot water discharge line. In one preferred embodiment, such means may comprise a band heater positioned around the upper exterior portion of the tank. In other embodiments, such means may comprise heat insulation at the top of the tank or selective positioning of the immersion heater.

During brewing, the inlet water valve is opened to permit water to flow into the tank and the vent tube valve is closed, thereby tending to contract the air in the air accumulator space by the rising water level within the tank. However, in accordance with this invention, the air barrier is prevented from contracting by the relase of enough additional air during the cycle to maintain the desired air barrier volume at the top of the tank. This forces the water level in the tank to be held generally at the level of the inlet opening of the hot water discharge line within the tank, thereby preventing dripping at the end of the brew cycle without the need of any siphoning action.

During the standby period between brew cycles, the inlet water valve is closed, the air accumulator space vent tube valve is opened. If a band heater is used, it is turned off at this time.

As the immersion heater heats the water during standby periods, the water volume in the tank increases, due to thermal expansion. This increased water volume rises in the air accumulator space at the top of the tank. Since, at this time, the air accumulator space is vented to atmosphere through the open air accumulator space vent tube valve and the hot water discharge tube, water is prevented from being discharged through the hot water discharge tube. Thus, the invention provides the advantage of brewing under compression while serving as a vented system during standby periods.

SUMMARY OF THE INVENTION

A no-drip siphonless beverage maker which comprises a tank for heating the water used for brewing a beverage, said tank having thermostatically controlled heating means for heating the water, a means to maintain heat at the upper portion of the tank, inlet water valve means opened during the brew cycle to cause water to flow into the tank for forcing hot water out of a discharge tube to the beverage brewing chamber, the increase of water volume within said tank tending to cause the air within an air accumulator space at the top of the tank to be contracted, with sufficient air being released during the cycle so as to prevent contraction and maintain the tank water at the level of the inlet opening of the discharge tube to prevent dripping at the end of the brew cycle, and means to vent the air accumulator space during standby periods between brew cycles to prevent discharge of water during said standby periods.

These and other objects, features and advantages of the present invention will be more clearly understood through consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
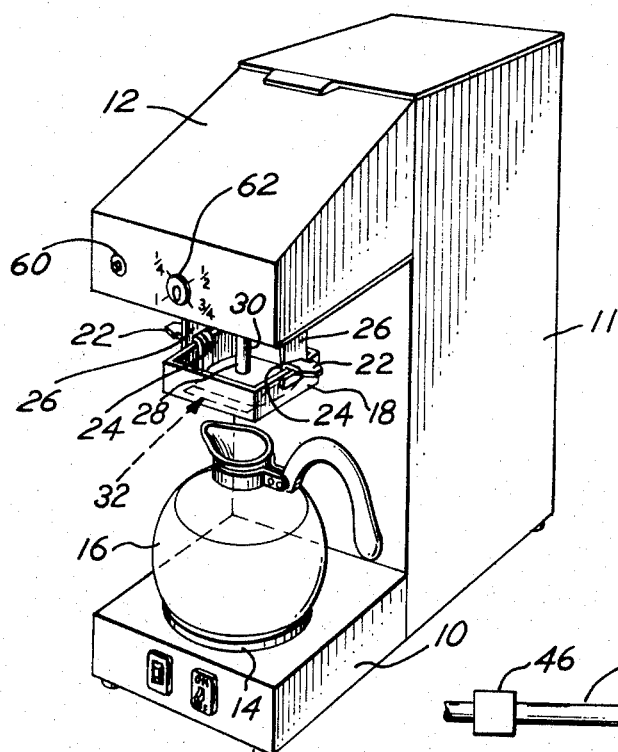
FIG. 1 is an overall view of a preferred embodiment of beverage maker capable of utilizing the principles of our invention.

Referring to FIG. 1, a beverage maker and, in particular, a beverage maker for preparing coffee, is shown which comprises a horizontal base housing 10, an upstanding housing 11, and an overhanging top housing 12. A suitable electric heating element 14 is provided on the upper surface of the base housing 10 for maintaining the temperature of the brewed coffee in a conventional open-necked pot 16. Suspended from the overhanging top housing 12, is a cartridge supporting receptacle 18 of generally box-like configuration and having a perforated bottom 20 and a pair of horizontally extending handles 22. The handles 22 are adapted to be received in slots 24 formed in downwardly depending brackets 26 for positioning and maintaining the receptacle 18 in position relative to the discharge end 28 of a hot water discharge conduit 30. An envelope-type cartridge 32, containing the ground coffee for use in brewing the coffee, is positioned in the receptacle 18, the cartridge being formed of suitable relatively permeable closure material , such as filter paper.

Those skilled in the art will appreciate that the beverage maker shown in FIG. 1 is a representative type of known beverage making apparatus which has been disclosed herein merely to illustrate one form of beverage maker capable of utilizing the principles of the present invention. It is understood that use of the invention is not limited to the illustrative apparatus of FIG. 1 or only to coffee makers, but finds equally advantageous use in a wide variety of beverage making structures.

Figure 2:
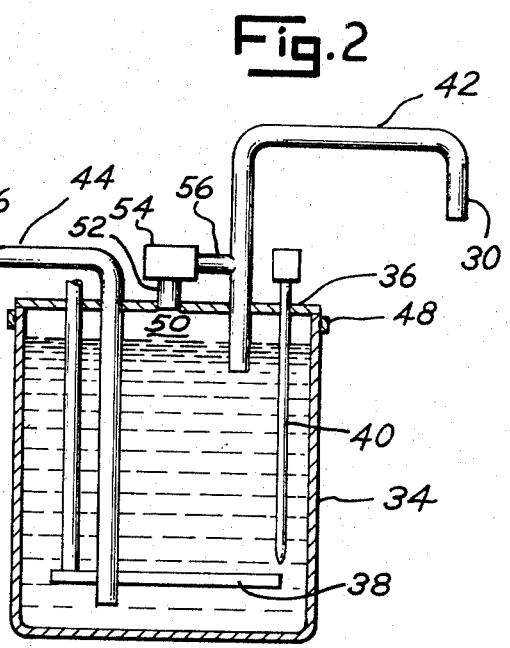
FIG. 2 is a diagrammatic view of a beverage hot water tank and associated equipment illustrating the principles of our invention; and FIG . 3 is an electric circuit diagram of a preferred embodiment of control circuit of our invention.

The upstanding housing 11 of the FIG. 1 beverage maker houses a hot water tank and associated equipment embodying the present invention, as shown in detail in FIG. 2 of the drawing. The hot water tank 34 has an open top, which in the assembled condition shown, is closed by the cover 36. The water within tank 34 is maintained at a desired elevated temperature by means of an immersion heater 38 and thermostat 40 located within the tank such that hot water can be delivered through a hot water discharge tube 42 including conduit 30 to the coffee cartridge 32 (FIG. 1) when the user desires to brew coffee.

Cold water is delivered to the tank 34 by means of an inlet water supply line 44 connected to a suitable water supply source. Inlet water supply line 44 has a normally closed valve 46 in the water supply path and terminates within tank 34 at a position generally near the bottom of the tank. When cold water is delivered to the tank, the previously heated water in the tank is forced out of the hot water discharge tube 42, which has its entrance located generally near the top of the tank, as illustrated in FIG. 2.

In accordance with a feature of this preferred embodiment of the invention, a band heater 48, sometimes herein referred to as an air accumulator space heater, is positioned around the hot water tank 34 at the upper portion thereof so as to be in heat transferring relationship with the air accumulator space 50, which is located within the tank between the top of the water and the tank cover, and serves as a barrier therebetween. The air accumulator space 50 communicates with a vent tube 52 which extends upwardly from tank cover 36 to a normally open valve 54. The latter communicates through a connecting tube 56 to the hot water discharge tube 42.

Figure 3:
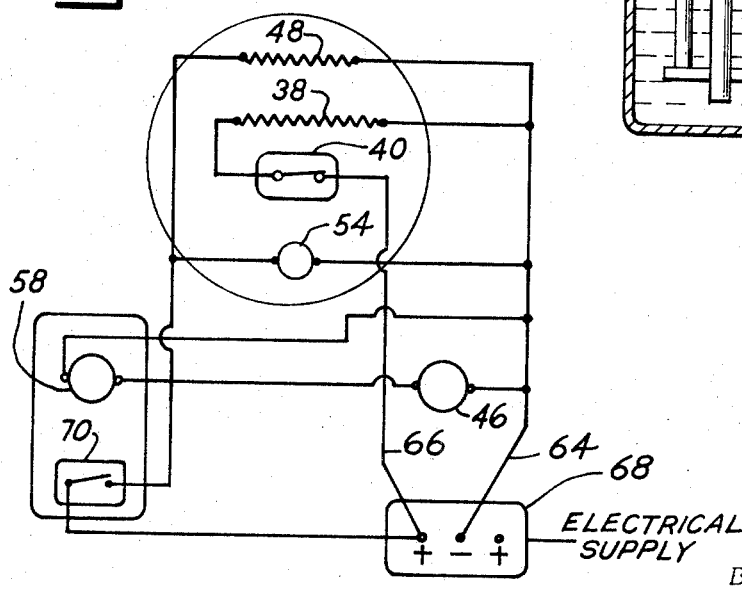

A preferred embodiment of electric circuit for controlling the operation of the beverage maker is illustrated in FIG. 3. A pair of leads 64 and 66 are connected to a suitable power source 68. The immersion heater 38 and thermostat 40 are connected in series to the leads 64 and 66. The air accumulator space heater 48 is connected from lead 64 to the normally open switch 70, and thence back to lead 66. The normally open valve 54 also is connected between the lead 64 and the normally open switch 70. The timer motor 58 and normally closed valve 46 each are connected in series with the normally open switch 70 between the leads 64 and 66.

Referring particularly to the drawing, the operation of the novel beverage making apparatus will be described. When the push button 60 is operated to initiate the brew cycle, the normally open switch 70 is closed to start the operation of timer motor 58 to initiate the brew cycle. The timer continues to run for a predetermined length of time depending upon the amount of coffee to be brewed. If desired, a selector switch 62 may be provided to selectively adjust the length of operation of the timer to increase or decrease the amount of water delivered from the tank 34 to the coffee cartridge. When the desired amount of hot water has been discharged, the timer opens switch 70 to open the circuit of the timer motor 58 and terminate the brew cycle.

The closing of switch 70 at the start of the brew cycle closes the circuit to energize the air accumulator space heater 48. It also serves to cause normally open valve 54 to be closed and normally closed valve 46 to be opened. It will be noted that the immersion heater 38 is energized only in response to the operation of thermostat 40 such that there is hot water maintained within tank 34 at all times, including the standby periods between brew cycles.

The opening of valve 46 during the brew cycle causes water to flow into tank 34 from the inlet water supply line 44, passing down through line 44 to the bottom of the hot water tank 34, pushing the heated water already in the tank toward the top of the tank. The water already in the tank is at a predetermined elevated temperature in preparation for brewing by the immersion heater 38 and thermostat 40. A cartridge 32, containing the desired amount of coffee grounds, is in the receptable 18, which receptacle is suspended from brackets 26 such that the cartridge 32 is positioned closely adjacent and beneath the discharge end 28 of conduit 30. The pot 16, in which the brewed coffee is to be collected is positioned on the heating element 14 beneath the cartridge 32.

Because the vent tube 54 is closed during the brewing cycle, the rise of the water level within tank 34 resulting from the inflow of cold water tends to contract the air barrier within the air space 50 and the vent tube 52.

In accordance with a novel feature of this invention, the contraction of the air barrier at the top of the tank 34 is prevented because sufficient air is released from the water during the brewing cycle to maintain the volume of the air barrier substantially constant. As a result, the air barrier in the air accumulator space 50 maintains the level of the water within the tank at the level of the entrance to the hot water discharge tube 42. In this manner, hot water is discharged through the discharge tube 42 and conduit 30 during the brew cycle to brew the coffee with the water in the tank being maintained at the level of the discharge tube opening.

At the end of the brew cycle, the timer motor causes switch 70 to open thereby de-energizing band heater 48, opening the vent tube valve 54 and closing the inlet water valve 46. During the following standby period, the immersion heater will continue to be energized periodically under control of thermostat 40 to maintain the temperature of hot water within tank 34. As the immersion heater 38 heats the tank of water during the standby period, the water volume will increase due to thermal expansion. This causes the water level to rise into the air accumulator space 50. Since the latter now is vented to the atmosphere through the normally open valve 54, the connecting tube 56 and the hot water discharge tube 42, hot water is prevented from being pushed up through the bottom of the discharge tube 42 and no dripping will result. Accordingly during standby periods, the invention acts as a vented system.

In lieu of the band heater 48, the air barrier volume in the air accumulator space may be maintained during the brew cycle by any suitable means sufficient to heat the upper portion of the tank so as to prevent contraction of the air barrier. This may be accomplished for example, by providing heat insulating means at the top of the tank or by locating the immersion heater at a higher position within the tank.

It will be understood by those skilled in the art that the preferred embodiment of the invention which has been described, is merely illustrative of one application of the principles of the invention. Numerous modifications may be made by those skilled in the art without departing from the true spirit and scope of the invention.

What is claimed is:

1. A no-drip siphonless beverage maker for making a beverage by passing hot water through a beverage material, which comprises a tank for heating the water used for brewing a beverage, said tank have heating means for heating the water, said heating means including a heater in heat transfer relation with the water in the tank, inlet water valve means adapted to be opened during a brew cycle to cause water to flow into the tank for forcing hot water out of a discharge tube to the beverage material to initiate the brew cycle, the increase of water volume within said tank tending to contract an air barrier within an air accumulator at the top of the tank, means to maintain the air accumulator space at the top of the tank substantially constant to insure that the level of whater in the tank is substantially at the level of the opening to the discharge tube to prevent dripping at the end of the brew cycle and means to vent the air accumulator space at some time during a standby period between brew cycles to prevent discharge of water during said standby period.

2. A no-drip siphonless beverage as in claim 1 wherein the heating means is thermostatically controlled and timing means are provided to actuate the inlet water valve means.

3. A no-drip beverage maker in accordance with claim 1 further comprising measuring means for opening said inlet water valve means during the brew cycle and for cosing the same at the end of the brew cycle.

4. A no-drip beverage maker in accordance with claim 1 wherein said means to maintain the accumulator space comprises a heater positioned at the upper portion of the tank and measuring means for energizing said heater during the brew cycle and for de-energizing the same during the standby period between brew cycles.

5. A no-drip beverage maker in accordance with claim 1 further comprising measuring means for closing said vent means during the brew cycle and opening said vent means some time during the standby period between brew cycles.

6. A no-drip, non-siphoning method of brewing a beverage by passing hot water through a beverage material comprising the steps of (a) heating water in a tank which is closed except for a discharge conduit,
(b) initiating a brewing cycle by causing cold water to flow into said tank to be heated and to replace the hot water, which flows through the discharge conduit and is discharged from said discharge conduit over the beverage material,
(c) causing the air in the tank between the top of the water and the top of the tank to be accumulated in an air acumulator space to form an air barrier between the top surface of the water and the top of the tank,
(d) terminating the intake of cold water to the tank and thereby ending the brewing cycle and initiating a standby period,
maintaining the temperature at the upper portion of the tank,
(e) thereby utilizing the air barrier in the air accumulator space to maintain the level of the water in the tank at the level of the entrance to the discharge conduit within the tank.
(f) venting the tank to atmosphere during the standby period when cold water does not flow into the tank to prevent dripping from the discharge conduit during the standby period.

7. A no-drip, non-siphoning method of brewing a beverage by passing hot water through a beverage material comprising the steps of (a) heating water in a tank which is closed except for a discharge conduit,
(b) initiating a brewing cycle by causing cold water to flow into said tank to be heated and to replace the hot water which is discharged from said discharge conduit over the beverage material,
(c) causing the air in the tank between the top of the water and the top of the tank to be accumulated in an air accumulator space to form a barrier between the top surface of the water and the top of the tank,
(d) heating the upper portion of the tank to prevent contraction of the air released during the brew cycle to maintain a desired volume of air in the air accumulator space,
(e) terminating the intake of cold water to the tank and thereby ending the brewing cycle and initiating a standby period,
(f) utilizing the accumulated air in the air accumulator space to maintain the level of the water in the tank down to the level of the opening of the discharge conduit within the tank,
(g) venting the tank to atmosphere during the standby period between brewing cycles when cold water does not flow into the tank to prevent dripping from the discharge conduit during the standby period.

8. A no-drip, siphonless beverage maker for providing compression during a beverage brew cycle and venting at some time during the standby period between brew cycles, which comprises a tank for heating the water used for brewing a beverage, said tank having heating means including a heater in heat transfer relationship with the water in the tank, inlet water valve means for directing cold water into the tank to replace the heated water in the tank, a discharge conduit having an inlet end in the tank and an outlet end, whereby heated water displaced from the tank can flow through the discharge conduit and be discharged from the outlet end thereof over beverage material to form a liquid brew, the air in the tank between the top of the water and the top of the tank being accumulated in an air accumulator space to form an air barrier between the top surface of the water and the top of the tank, control means for initiating a brew cycle by opening the inlet water valve means and terminating the brew cycle by closing the inlet water valve means, means to maintain the temperature at the upper portion of the tank to enable said air barrier to maintain the level of water in the tank at the level of the inlet end of the discharge conduit during the brew cycle, and means for venting the air accumulator space to atmosphere during the period between brew cycles to prevent discharge of water through the discharge conduit, thereby preventing dripping at the end of the brew cycle during the standby period.

9. A no-drip beverage maker as in claim 8 wherein the venting means includes a vent valve closed during the brew cycle and open during the standby peroid, whereby during the standby period, the air accumulator space will be vented and no dripping of water from the discharge tube will occur if the water level in the tank should rise due to thermal expansion.

References Cited
UNITED STATES PATENTS

| | | | |
|---|---|---|---|
| 3,443,508 | 5/1969 | Reynolds et al. | 99—295 X |
| 3,523,178 | 8/1970 | Spensley et al. | 99—281 X |
| 3,220,334 | 11/1965 | Martin | 99—282 |
| 3,385,201 | 5/1968 | Martin | 99—295 X |

FRANK W. LUTTER, Primary Examiner

W. L. MENTLIK, Assistant Examiner

U.S. Cl. X.R.

99—281, 307